Dec. 11, 1956  J. D. CZARNECKI  2,773,496
MACHINE FOR MELTING AND FEEDING SOLIDIFIED MATERIALS
Filed Dec. 21, 1951  3 Sheets-Sheet 1

INVENTOR.
JOHN D. CZARNECKI
BY Charles H. Erne
Leland R. McCann
George W. Reiber
ATTORNEYS Dec. 11, 1956    J. D. CZARNECKI    2,773,496
MACHINE FOR MELTING AND FEEDING SOLIDIFIED MATERIALS
Filed Dec. 21, 1951    3 Sheets-Sheet 2

INVENTOR.
JOHN D. CZARNECKI
BY
ATTORNEYS

Dec. 11, 1956  J. D. CZARNECKI  2,773,496
MACHINE FOR MELTING AND FEEDING SOLIDIFIED MATERIALS
Filed Dec. 21, 1951  3 Sheets-Sheet 3

INVENTOR.
JOHN D. CZARNECKI
BY Charles H. Erne
Leland R. McCann
George W. Reifer
ATTORNEYS United States Patent Office
2,773,496
Patented Dec. 11, 1956

2,773,496
MACHINE FOR MELTING AND FEEDING SOLIDIFIED MATERIALS

John D. Czarnecki, Oak Park, Ill., assignor to American Can Company, New York, N. Y., a corporation of New Jersey Application December 21, 1951, Serial No. 262,861

5 Claims. (Cl. 126—343.5)

The present invention relates to a machine for reducing solidified materials, such as thermoplastic cements or adhesives, to a fluid or plastic form for subsequent use and has particular reference to devices for melting and feeding the material.

An object of the present invention is the provision of a machine wherein materials such as thermoplastic cement or adhesive initially cast or made in solid molded form to facilitate storing and handling, may be quickly and efficiently reduced to a fluid or semi-liquid form for use in an applicator or like device.

Another object is the provision of such a machine wherein the rate of reduction of the material can be controlled by heat and pressure exerted against the material so that the flow of the melted material may be regulated in accordance with the quantity used.

Another object is the provision of such a machine wherein feeding of the reduced material for use is effected by a separate fluid pressure exerted against the melted material so that a uniform and controllable feeding pressure may be obtained.

Another object is the provision of such a machine wherein reloading of the machine with material to be reduced may be effected without in any way affecting the feeding of the reduced material already in the machine.

Numerous other objects and advantages of the invention will be apparent as it is better understood from the following description, which taken in connection with the accompanying drawings, discloses a preferred embodiment thereof.

Referring to the drawings:

Fig. 4 is a transverse sectional view of a cylinder portion of the machine as taken substantially along lines 4—4 of Fig. 1, showing the open and closed position of a cover on the cylinder portion; and Fig. 5 is a perspective view showing a body or molded mass of cement or like material to be used in the machine illustrated in the drawings.

As a preferred or examplary embodiment of the instant invention the drawings disclose a machine for breaking down and liquifying cylindrical blocks A (Fig. 5) of solidified thermoplastic cement or adhesive and for feeding the liquified cement or adhesive to a conventional applicator used in various manufacturing operations. One example of such a thermoplastic material is that covered by application Serial Number 129,879 filed November 28, 1949, in the name of John D. Czarnecki, now Patent Number 2,597,855.

Figure 1:
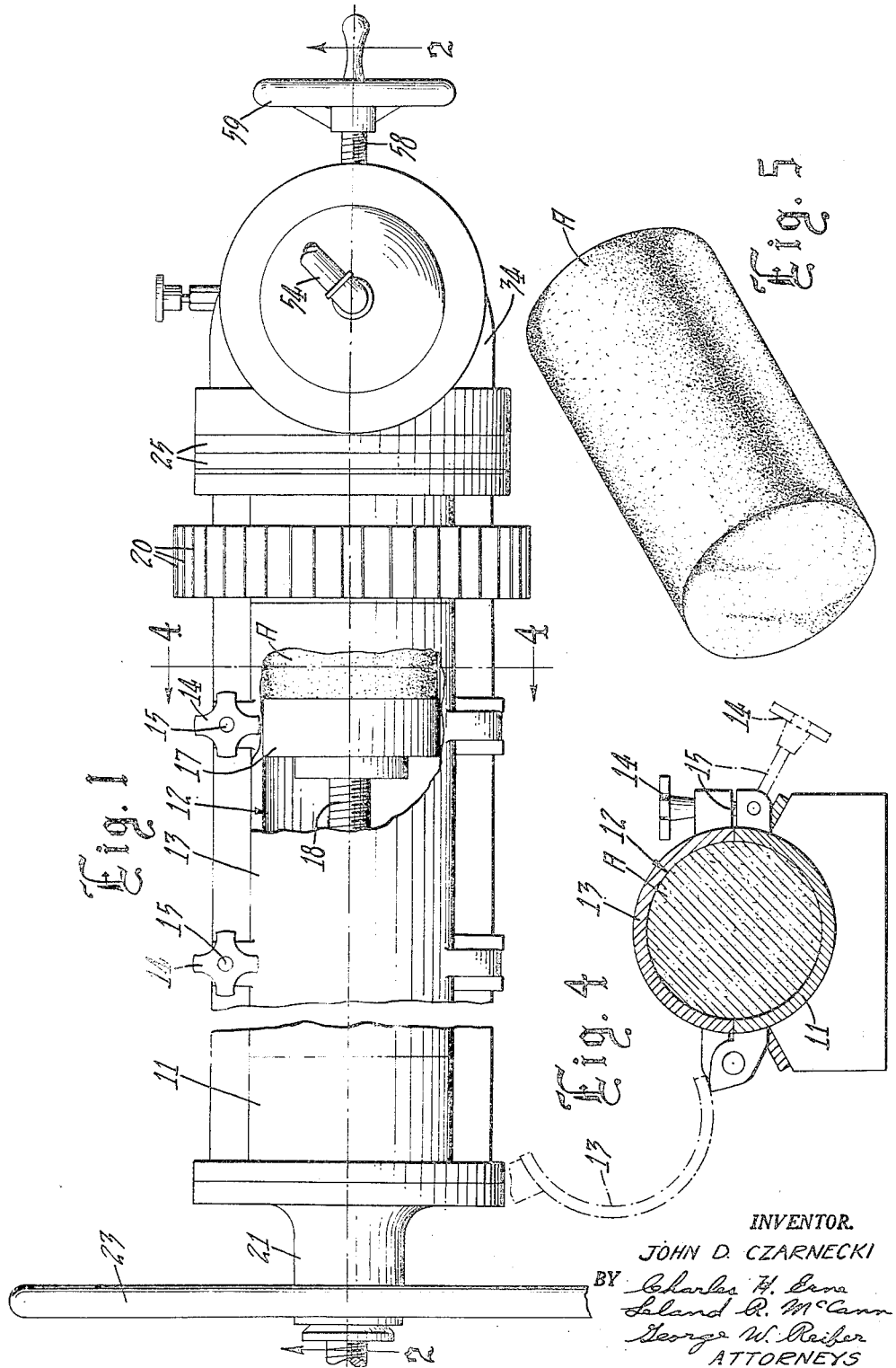
Figure 1 is a top plan view of a machine embodying the instant invention.

Reduction of the solid block A to a fluid or plastic condition is effected by heat and pressure. For this purpose the machine is provided with a horizontally disposed cylindrical housing 11 (Figs. 1 and 2) which encloses a chamber 12 for the reception of a block A of the cement. A portion of the upper half of the housing 11 is formed as a cover 13 hingedly secured to the lower half of the housing to facilitate placing of a block A of the cement into the chamber. After the chamber is loaded the cover may be locked against displacement by a plurality of hand nuts 14 (Figs. 1 and 4) threaded onto eye bolts 15 pivotally secured to the lower half of the housing.

The receiving chamber 12 (Fig. 2) contains a block compressing or feeding piston 17 which is carried on the inner end of a long actuating screw 18 threadedly engaged in a rotatable sleeve 19 mounted in a bearing 21 formed in the outer end of the cylindrical housing 11. A shoulder 22 on the inner end of the sleeve 19, i. e. within the housing 11, and a handwheel 23 secured to the outer end of the sleeve, i. e. on the outside of the housing, retains the sleeve in place against axial displacement. By rotating the handwheel 23 the sleeve 19 is rotated and the actuating screw 18 is shifted axially to advance the piston 17 into engagement with an end of the block A of cement within the chamber 12 and to thereby feed the block forward (toward the right in Fig. 2) for a melting operation.

Figure 2:
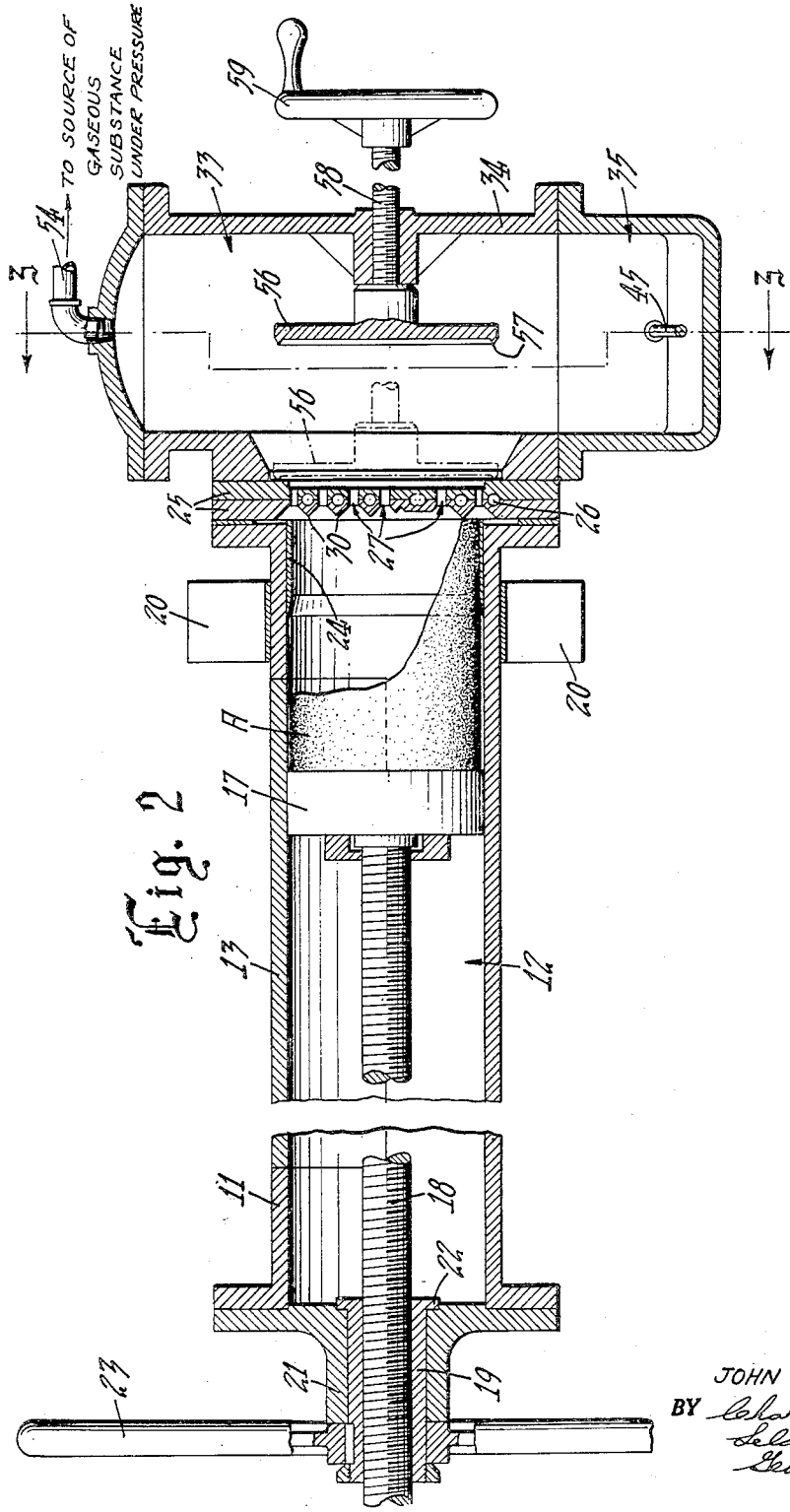
Fig. 2 is a longitudinal sectional view of the machine taken substantially along lines 2—2 of Fig. 1.

The advancing block A is first forced into a constricting ring 24 which is disposed within the cylinder 12 adjacent its inner end and secured in place against movement. The inner diameter of the ring is slightly smaller than the outer diameter of the block A so that the block will completely fill the ring and thereby block-off the end of the cylinder for a purpose to be hereinafter mentioned. The entrance end of the ring is tapered as shown in Fig. 2 to facilitate insertion of the block into the ring. In order to prevent overheating of the ring 24 and the end of the block adjacent its leading face, during the melting operation, a plurality of cooling fins 20 surround the cylinder 12 adjacent the constricting ring 24.

For the melting operation the block A of cement is fed by the piston 17 against a heated plate or grid element 25 disposed at the inner end of the housing 11 adjacent the end of the constricting ring 24. This grid 25 preferably is made of two discs or plates with an electric heating element 26 embedded between them. The heating element 26 preferably is formed as a spiral which covers most of the grid. A series of small diameter apertures 27 disposed on opposite sides of the spiral heating element extend through the grid as best shown in Fig. 2. The heating element 26 is connected by wires 28, 29 to any suitable source of electric current. The inner face of the grid element 25 is formed with a plurality of spiral ridges or projections 30 which coincide with the spiral heating element 26 and which have tapered sides to facilitate melting of the material pressed against the grid and to lead the melted material into the openings 27.

Hence as a block A of the cement is fed by the piston 17 through the constricting ring 24 and against the adjacent face of the heated grid 25 the face of the block in contact with the grid is partially melted or softened and the melted or softened material flows through the grid apertures 27 and downwardly over the opposite face of the grid as a viscous semi-liquid. The constricting ring 24 prevents the melted material from flowing back into the chamber 12. The temperature of the grid 25 may be controlled by conventional heat regulator devices if desired to control the degree of fluidity of the reduced cement in accordance with the characteristics of the material being reduced.

Figure 3:
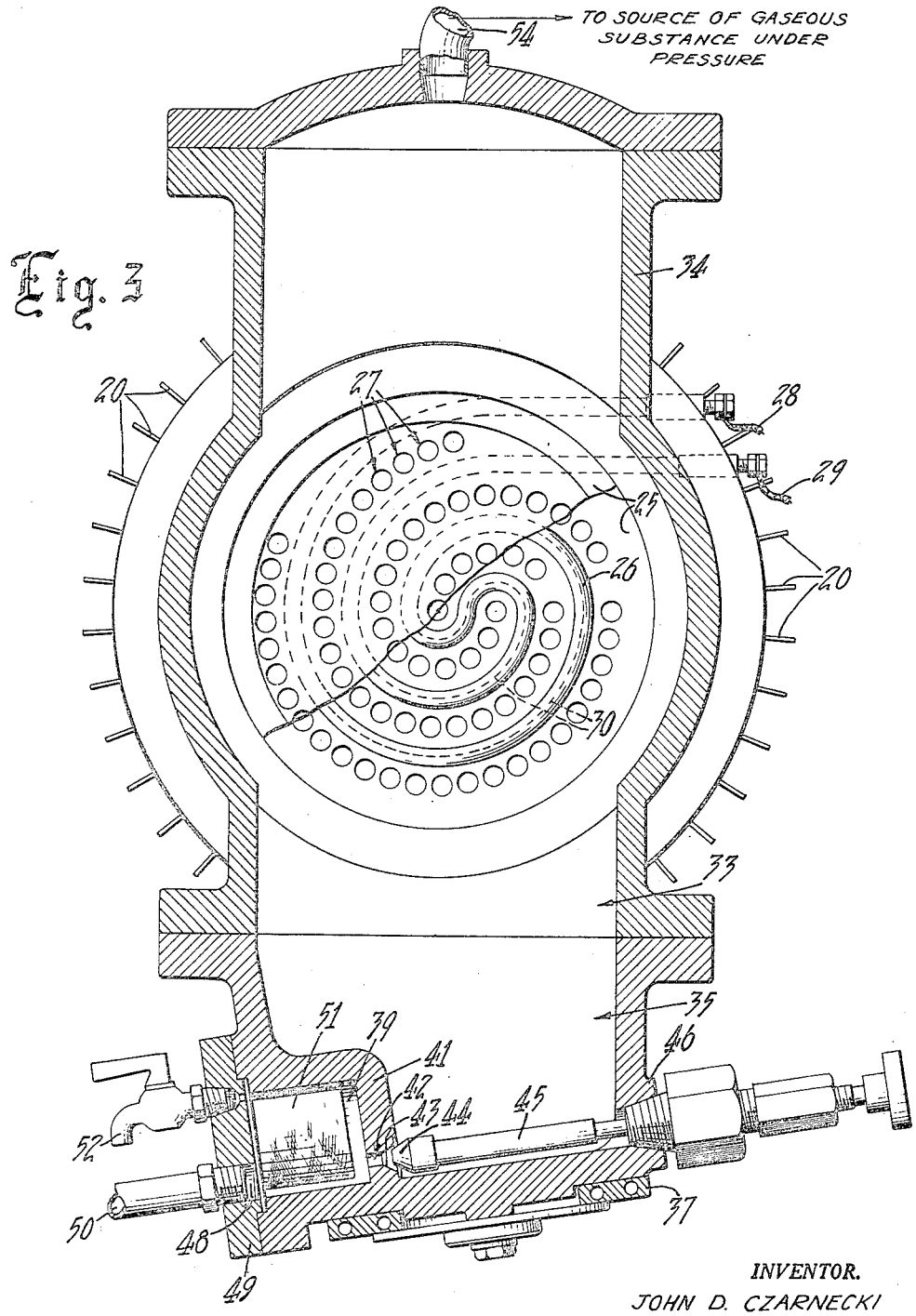
Fig. 3 is an enlarged vertical sectional view of a reservoir section of the machine as taken substantially along lines 3—3 in Fig. 2.

The semi-liquid cement flows through the grid 25 into a pressure chamber 33 (Fig. 3) which is disposed adjacent the grid and which is enclosed by a casing 34 secured to the grid end of the block receiving housing 11. The bottom of the casing 34 carries a reservoir 35 which extends below the housing and which receives the semi-liquid cement from the pressure chamber 33. A ring shaped electric heater 37 which is heated from any suitable source of electric current is secured to the bottom of the reservoir 35 and heats the reservoir to maintain the reduced cement in its semi-liquid condition or if desired to further reduce the cement to a more liquid state.

The reduced or fluid cement is fed from the reservoir chamber 35 into a screening or discharge chamber 39 which is disposed in the reservoir but is isolated therefrom by a dividing wall 41. Communication between the discharge chamber and the reservoir is effected and controlled by way of a valve opening 42 in the dividing wall 41. This valve opening 42 is formed with a valve seat 43 for a manually operable valve head 44 carried on a rotatable stem 45 threadedly engaged in a boss 46 of the casing 34. By adjusting the valve head 44 relative to its seat 43 the flow of the reduced cement from the reservoir 35 to the screening chamber 39 may be controlled.

Liquified cement entering the screening chamber 39 is discharged therefrom through a discharge orifice 48 in a cover plate 49 which encloses one side of the discharge chamber 39. This orifice communicates with a pipe 50 which leads to and terminates in a conventional applicator (not shown) for whatever use it may be desired. The orifice is surrounded and shielded by a screen 51 disposed within the discharge chamber 39 for screening out of the liquified cement any unreduced portions or foreign matter that may clog the pipe or the applicator. A vent valve 52 threadedly secured in the cover plate 49 and having communication with the discharge chamber 39 in the space surrounding the screen 51 is provided for bleeding off undesirable accumulation of sludge in the discharge chamber or for otherwise venting this chamber.

The flow of the liquified cement from the pressure chamber 33 to and through the discharge chamber 39, the screen 51, the discharge orifice 48, the pipe 50 and the applicator at the end of the pipe preferably is effected under pressure. For this purpose a suitable gas or gaseous substance is introduced into the pressure chamber 33 by way of an inlet pipe 54 threadedly secured in the top of the pressure chamber casing 34. This pipe leads from any suitable source of supply of the gaseous substance under pressure. The constricting ring 24 in the cylinder 12 prevents the leakage of this gas back through the cylinder.

Provision is made for replenishing the receiving chamber 12 with a new block A of cement without interfering with the operation of the pressure chamber 33. For this purpose the pressure chamber 33 contains a plate valve 56 disposed in axial alignment with the grid 25 and for movement toward and away from the grid and having on its inner face a raised annular knife edge 57 enclosing an area slightly greater than the area covered by the apertures 27 in the grid. The plate valve 56 is mounted on the inner end of a screw or stem 58 which extends through a threaded boss in the casing 34. Outside of the casing the stem carries a handwheel 59.

By turning the handwheel 59 the plate valve 56 may be shifted from its normal position shown in full lines in Fig. 2, to a position adjacent the grid 25 with its knife edge 57 engaging the grid and sealing off all of the apertures 27 from the pressure chamber 33 as shown in dotted lines in Fig. 2. Thus the gas from the pressure chamber 33 is prevented from escaping through the apertures so that the housing 11 may be readily opened for replenishment of the cement block while the gas in the pressure chamber is maintained at its normal pressure for continuing the feeding of the reduced cement to the applicator.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for feeding and melting a solid block of thermoplastic material comprising in combination a hollow cylinder for holding the material, a grid element disposed adjacent an open end of said cylinder in communication therewith, said end being constricted to engage tightly around the periphery of said block of material disposed in said end to form a seal between said grid element and the portion of said cylinder remote from said grid element, said grid element having a plurality of discrete passages therethrough, means in said cylinder for advancing said material against said grid element, means for heating said grid element to melt said material to a flowable condition so that it will flow through said passages for subsequent use, and cooling means surrounding and in contact with said cylinder adjacent said constricted end to keep portions of said material remote from said grid element in a solid state.

2. The machine set forth in claim 1 wherein there is provided a pressurized chamber adjacent said grid element for receiving melted material from said grid element.

3. The machine set forth in claim 1 wherein said grid element is a perforated plate having ridges extending toward said cylinder from the adjacent face of said plate and being located between the perforations in said plate to facilitate melting the material pressed against said plate and to lead the melted material into said perforations.

4. The machine set forth in claim 1 wherein said constricted end is formed by having a sleeve in the portion of said cylinder adjacent said grid element and having its outside circumference conforming to and in contact with the inside circumference of said portion of said cylinder, the inside surface of said sleeve remote from said grid element tapering outwardly toward the wall of said cylinder to form a tapered entrance end on said sleeve to facilitate entrance of said material into said sleeve.

5. The machine set forth in claim 1 wherein there is provided a pressurized chamber adjacent said grid element for receiving melted material from said grid element, an outlet connected with said pressure chamber for dispensing said melted material, means for introducing a fluid under pressure into said pressure chamber to exert pressure on said melted material to facilitate dispensing of said melted material from said outlet, an imperforate valve plate disposed in said pressure chamber adjacent said grid element, and means for shifting said plate into position over said grid element to close said grid element against the escape therethrough of said fluid under pressure so that reloading of said cylinder with additional material may be accomplished without affecting the pressure on the material in said pressure chamber.

References Cited in the file of this patent
UNITED STATES PATENTS

| | | |
|---|---|---|
| 614,198 | Boorman | Nov. 15, 1898 |
| 709,315 | Gilmer | Sept. 16, 1902 |
| 945,546 | Jonasson | Jan. 4, 1910 |
| 950,413 | Stedman | Feb. 22, 1910 |
| 988,798 | Maxim | Apr. 4, 1911 |
| 1,249,565 | Wagner | Dec. 11, 1917 |
| 1,502,315 | Moller | July 22, 1924 |
| 1,940,353 | Jenkins | Dec. 19, 1933 |
| 2,070,206 | Hudson | Feb. 9, 1937 |
| 2,190,084 | Schlumbohm | Feb. 13, 1940 |
| 2,207,426 | Bailey | July 9, 1940 |
| 2,270,726 | Elye | Jan. 20, 1942 |
| 2,472,594 | Kuehn | June 7, 1949 |
| 2,515,136 | Pigott | July 11, 1950 |
| 2,605,760 | Cayas | Aug. 5, 1952 |
| 2,648,264 | Green | Aug. 11, 1953 |